United States Patent Office 3,849,483
Patented Nov. 19, 1974

3,849,483
TRISODIUM-MONOANILINE SALT OF
2-NAPHTHOL-3,6-DISULFONIC ACID
Martin Louis Feldman, East Brunswick, Donald William Hagedorn, Roxbury Township, and John Edson Gordon, Bridgewater Township, N.J., assignors to American Cyanamid Company, Stamford, Conn.
No Drawing. Original application Oct. 6, 1972, Ser. No. 295,756. Divided and this application Feb. 7, 1974, Ser. No. 440,420
Int. Cl. C07c 143/42
U.S. Cl. 260—501.21
1 Claim

ABSTRACT OF THE DISCLOSURE

R-salt, the disodium salt of 2-naphthol-3,6-disulfonic acid, is isolated in pure form and high yield from sulfonation product mixtures resulting from the sulfonation of beta-naphthol and containing R-acid and isimers thereof, particularly G-acid, by a process comprising (1) dissolving the sulfonation product mixture in water to provide a water solution containing a defined concentration of R-salt, (2) reacting the solution with a defined proportion of aniline in the presence of a defined amount of sodium ions at a temperature of about 70–90° C., (3) cooling the solution to form a precipitate of the tri-sodium monoaniline salt of the R-acid therein, (4) separating the precipitate from the solution, (5) reacting the precipitate, in the presence of water, with sodium hydroxide to convert the tri-sodium monoaniline salt of the R-acid to the di-sodium salt thereof, i.e., R-salt, (6) removing the free aniline formed in step (5) by steam distillation and (7) separating the R-salt from the water.

---

This is a division of application Ser. No. 295,756, filed Oct. 6, 1972.

This invention relates to an improvement in the process for the manufacture of R-salt, the disodium salt of 2-naphthol-3,6-disulfonic acid (Formula I). More particularly, this invention relates to a method for separating and isolating R-salt from isomers and analogs, in particular G-salt, the disodium salt of 2-naphthol-6,8-disulfonic acid (Formula II), and the trisodium salt of 2-naphthol-3,6,8-trisulfonic acid (Formula III), through formation of the trisodium-monoaniline salt (or complex) of 2-naphthol-3,6-disulfonic acid (Formula IV). The invention also relates to the trisodium-monoaniline salt of Formula IV as a new composition of matter.

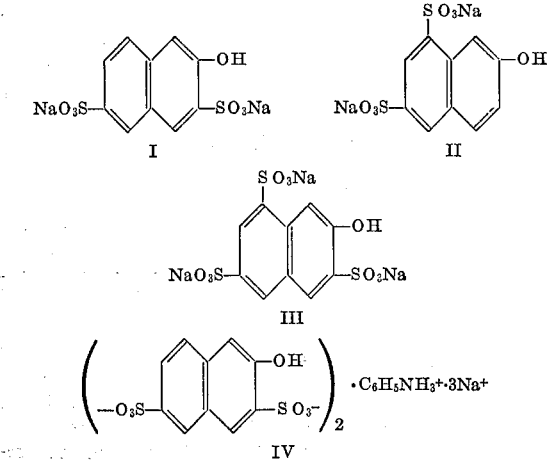

R-salt is a very important azo dye intermediate and it is also an intermediate for fast green acid triphenylmethane dyes. Representative dyes for which it is an intermediate include Acid Red 26, C.I. 16150; Food Red 6, C.I. 16155; Acid Red 115, C.I. 27200; and Acid Green 50, C.I. 44090. Furthermore, R-salt can be converted to other dye intermediates such as 2-naphthylamine-3,6-disulfonic acid and 2,3-naphthalenediol-6-sulfonic acid. R-salt was first reported in 1880 (Ber., 13, 1956). In 1964, the production of R-salt in the United States was over 2 million pounds.

In the commercial processes for R-salt, beta-naphthol is sulfonated with at least 3 moles of concentrated sulfuric acid at a temperature of about 125° C. The sulfonation mass is then dissolved in a large volume of water and the R-acid or salt is separated therefrom. In the preferred sulfonation process, the reaction is carried out in the presence of a substantial amount of sodium sulfate.

The above is an over-simplified statement of the process for R-salt. In fact, R-acid is not the only sulfonation product obtained. It was early recognized (German Pat. 3,229, dated 1878) that G-acid (Formula II) is also a major component of the sulfonation melt, even when the best sulfonation conditions for R-acid are employed. 2-naphthol-3,6,8-trisulfonic acid (Formula III) is also a major component of the sulfonation melt. In addition to R-acid, G-acid and 2-naphthol-3,6,8-trisulfonic acid, small amounts of other sulfonic acids, such as 2-naphthol-6-sulfonic acid (Schaeffer acid), are formed. However, sulfonating in the presence of sodium sulfate tends to increase the proportion of R-salt formed.

The problem of separating the R-acid from the other products, particularly the G-acid, has been studied over the years and methods have been proposed for accomplishing the separation.

In some methods, advantage is taken of the different solubilities of the sodium, potassium, and barium salts of the sulfonic acids in water or alcohol. Fractional crystallization of the salts is also sometimes employed. Thus, the crude R-salt is often separated by salting out by the addition of salt. The crude R-salt must then be further treated for purification.

In another method, the R- and G-acids are separated by means of fractional coupling. R-salt couples easily with diazonium salts while G-salt does not [J. Chem. Soc., 89, 1511 (1906)].

The separation of the sulfonic acids of beta-naphthol by fractional crystallization of arylamine salts has also been proposed [J. Soc. Chem. Ind., 46, 25–31T (1927)]. Two methods were employed: (1) addition of the free amine (e.g., aniline) to a solution of the free sulfonic acids and (2) addition of the "amine in acid solution" (e.g., aniline hydrochloride) to a solution of metal salts of the sulfonic acids. In both cases, the product is the normal diarylamine (e.g., aniline) salt, i.e., a salt containing 1 mole of amine per sulfonic acid group. Thus, (1)    $X(SO_3H)_2 + 2Y—NH_2 \rightarrow X(SO_3 \cdot NH_3—Y)_2$
(2)    $X(SO_3Na)_2 + 2Y—NH_2 \cdot HCl \rightarrow$
    $X(SO_3 \cdot NH_3—Y)_2 + 2NaCl$ wherein X represents the residue of beta-naphthol and Y the phenyl group.

Although the above procedures are helpful in separating the sulfonic acids, none is completely satisfactory. There is, therefore, a need for a practical method for separating R-acid from G-acid and other sulfonation products by a procedure adaptable to modern automatic and labor-saving equipment and that will provide a high yield of very pure R-salt.

In accordance with the present invention, a method has now been discovered for separating and isolating R-salt from an R-acid sulfonation mass by a procedure which is relatively simple and can be used in automatic labor-saving equipment to obtain a very good yield of R-salt of high purity. Thus, it has been found that by dissolving a sulfonation mass containing sodium sulfate in water and adding to the solution specified amounts of aniline and in some instances a compound which provides additional sodium ions in the solution, such as sodium hydroxide, the trisodium-monoaniline salt of 2-naphthol-3,6-disulfonic acid (Formula IV, *supra*) is precipitated from the solution. The precipitated salt is then filtered off and converted to the di-sodium salt of 2-naphthol-3,6-disulfonic acid (R-salt) by reaction with sodium hydroxide in aqueous medium. The aniline (which is free from the precipitated salt by the reaction of the sodium hydroxide) is then separated by distillation or other known methods and the R-salt recovered from the water medium in highly pure form by crystallization and filtration or by evaporation to dryness of the R-salt solution.

The process of the invention thus involves the following steps: (1) dissolving a sulfonation mass, resulting from the sulfonation of beta-naphthol with concentrated sulfuric acid, in water, (2) reacting the water-solution of the sulfonation mass at a temperature of about 70–90° C. with specified amounts of aniline in the presence of sodium ions (the sodium either being present in the sulfonation mix or added thereto), (3) cooling the solution to a temperature below about 45° C., whereby a precipitate of the tri-sodium-monoaniline salt of R-acid is formed in said solution, (4) separating the precipitate from said solution, (5) reacting the precipitate, in the presence of water, with sodium hydroxide, to convert the tri-sodium-monoaniline complex of R-acid to the di-sodium salt of R-acid, (6) removing the free aniline by known methods and (7) separating the di-sodium salt of the R-acid from the water.

The sodium compound may be introduced before or during the sulfonation step or may be added to the sulfonation mass before or after the mass is drowned in water.

The procedure used in sulfonating beta-naphthol to form R-acid is not a part of this invention and is not critical to the success of the separation process of this invention provided only that R-acid is the predominant acid in the product melt.

In dissolving the sulfonation mass in water, sufficient water is used to provide an R-acid concentration of between 0.005 and about 0.050 gram moles, preferably about 0.030 gram moles, per 100 cc. of solution.

The aqueous solution of the sulfonation mass is heated to a temperature of between 70° and 100° C., preferably between 80° and 90° C., before the addition of aniline.

Sufficient aniline is added to provide between 0.5 and 3.0 gram moles, preferably between 0.5 and 1.5 gram moles, of aniline per gram mole of R-salt.

The sodium compound can be sodium hydroxide or a water-soluble sodium salt, such as sodium sulfate, sodium carbonate, sodium chloride, etc. Sufficient sodium compound is used to provide between 0.1 and 0.4 gram moles, preferably between 0.1 and 0.25 gram moles, of total sodium per 100 cc. of solution.

After the aniline and sodium compound have been added, the solution is cooled to a temperature of 45° C. or below, preferably below 30° C.

The crystalline precipitate of trisodium-monoaniline salt of R-acid is separated by filtration, centrifugation or by other means, and the crystals are washed free of mother liquor with cold water. The crystals are very easily separated by filtration and washed, with the result that further purification is unnecessary.

The crystals of the trisodium-monoaniline salt of R-acid are converted to R-salt (disodium salt) by treatment with sodium hydroxide in aqueous medium; the aniline may be removed by distillation. This can be done with a minimum amount of water present or the crystals can be dissolved in water before addition of the sodium hydroxide. A pH of between 7.5 and 8.5 is recommended. The R-salt solution or slurry (containing 80 to 90% of the R-salt formed in the sulfonation) can be filtered or dried to give R-salt having a high degree of purity.

The process of this invention is adaptable to batch operation or to continuous operation. It should be particularly noted that only one crystallization step is required.

The trisodium-monoaniline salt of R-acid is believed to be a new compound. Its composition and its distinction from the known dianiline salt of R-acid or a mixture of normal disodium and dianiline salts has been demonstrated by infrared, nuclear magnetic resonance and X-ray diffraction spectra, and the comparative solubilities and crystal morphology of the salts. Physical and analytical data for the new salt are shown in Example 3.

EXAMPLE 1

A sulfonator is charged with 6,800 pounds (68 pound moles) of 98% sulfuric acid, 2,200 pounds (15.5 pound moles) of sodium sulfate and 1,760 pounds (12.2 pound moles) of beta-naphthol. The sulfonation is run for 24 hours at 125° C. The resulting sulfonation melt, containing 9.15 pound moles of R-acid, is then drowned in water. The volume and temperature of the solution are adjusted to a volume equivalent to 29,500 pounds of water and 90° C., respectively. After stirring for 15 minutes at 90° C., 1,700 pounds (18.3 pound moles) of aniline are quickly added. After the addition, the solution is allowed to cool with stirring to 25° C. The precipitate is filtered from the solution and washed on the filter with water. This solid on analysis is shown to be a trisodium-monoaniline salt of R-acid.

The entire filter cake is then charged to a kettle and about 285 pounds of 50% sodium hydroxide solution is added to provide a pH of about 8.0. The aniline liberated by the caustic treatment is removed by steam distillation and may be reused. The residual aqueous solution is evaporated, yielding R-salt in a high degree of purity. About 80% of the R-salt produced by the sulfonation is recovered.

EXAMPLE 2

A sulfonation melt prepared as in Example 1 is drowned in water, the volume and temperature of the solution being adjusted to a volume equivalent to 26,500 pounds of water and 90° C., respectively. After stirring for 15 minutes at 90° C., 510 pounds (5.5 pound moles) of aniline were quickly added. After the addition, the solution is allowed to cool with stirring to 60° C. Additional sodium ions are added by charging 2650 pounds of 50% sodium hydroxide. The slurry is cooled with stirring to 25° C. The precipitate which on analysis is shown to be the trisodium-monoaniline salt of R-acid is filtered from the solution and washed on the filter with water.

A kettle is charged with the filter cake, and 50% sodium hydroxide solution is added to maintain a pH of about 8.0. The aniline liberated by the caustic treatment is removed by steam distillation and may be reused. The residual aqueous solution is evaporated, yielding R-salt in a high degree of purity. About 85% of the R-acid produced by the sulfonation is recovered.

EXAMPLE 3

To show that the precipitate produced in the sulfonation solution under the conditions of the present process is the tri-sodium monoaniline salt of R-acid, the following experiments were conducted.

Four aqueous sulfuric acid solutions (A, B, C and D) containing 10–12% R-acid and sodium ions were heated to 90° C. Amounts of aniline to provide the gram mole ratios of aniline to R-acid (per 100 cc. of solution) shown in Table I were added to each solution. The solutions were gradually cooled to 25° C. at which point the precipitated crystals were filtered off.

The crystals were then analyzed for aniline and sodium. The mole ratios of aniline to R-acid and of sodium to R-acid in the crystals are shown in Table I.

TABLE I

| Mole ratios | A | B | C | D |
|---|---|---|---|---|
| Aniline/R-acid, used | 2.0/1 | 1.5/1 | 1.0/1 | 0.6/1 |
| Aniline/R-acid, crystals | 0.5/1 | 0.5/1 | 0.48/1 | 0.48/1 |
| Na/R-acid, crystals | 1.36/1 | 1.56/1 | | 1.54/1 |

For comparison, a sample of the dianilinium salt of R-acid, prepared by adding 6 mole proportions of aniline per mole proportions of R-acid to an aqueous sulfuric acid solution containing about 3 grams of R-acid per 100 cc. of solution, was analyzed and found to contain 2 moles of aniline and less than 0.03 atom of sodium per mole of R-acid.

The X-ray patterns of crystals A, B, C and D were photographed and compared with the X-ray patterns of the dianilinium and the disodium salts of R-acid. The outstanding peaks of the X-ray patterns are shown in Table II.

TABLE II

| | A. |
|---|---|
| Disodium salt | 13.8 |
| Dianilinium salt | 8.5 |
| Crystals A [1] | 11.8 |
| Crystals B [1] | 11.8 |
| Crystals C [1] | 11.8 |
| Crystals D [1] | 11.8 |
| Crystals A [2] | 11.1 |
| Crystals D [2] | 11.1 |

[1] A dihydrate by Karl Fisher analysis for water.
[2] After drying at 70° C.—a monohydrate which reverted to the dihydrate on exposure to humid air.

The infrared spectrum of crystals A was compared with the infrared spectra of the dianilinium and disodium salts of R-acid. The spectrum of crystals A does not match either of the other spectra. (There is a considerable shift in one of the sulfonate bands near 1200 cm.$^{-1}$.)

The crystals A–D were examined microscopically and found to be long rectangular particles having parallel extinction. The alpha refractive index is 1.470 and the beta is 1.670.

The heat of crystallization of crystals A–D was determined to be —37.5 cal./g. and the specific heat, 0.2±0.02 cal./g. ° C.

We claim:

1. The trisodium-monoaniline salt of 2-naphthol-3,6-disulfonic acid.

References Cited

Foster et al.: J. Chem. Soc. Ind., pp. 25T–31T (1927).

LEON ZITVER, Primary Examiner

N. CHAN, Assistant Examiner

U.S. Cl. X.R.

260—512 C